United States Patent [19]

Maruyama

[11] Patent Number: 4,781,103

[45] Date of Patent: Nov. 1, 1988

[54] FLUID SERVOMECHANISM

[75] Inventor: Teruo Maruyama, Hirakata, Japan

[73] Assignee: Matsushita Electric Industrial Co. Ltd., Osaka, Japan

[21] Appl. No.: 886,664

[22] Filed: Jul. 16, 1986

[30] Foreign Application Priority Data

Jul. 19, 1985 [JP] Japan .................................. 160526

[51] Int. Cl.$^4$ ............................................ F01B 25/04
[52] U.S. Cl. ...................................... 91/171; 91/177; 91/517; 414/730; 901/37
[58] Field of Search ................ 91/171, 177, 178, 433, 91/517, 533, 173; 901/22, 37, 49; 414/739

[56] References Cited

U.S. PATENT DOCUMENTS

| | | | |
|---|---|---|---|
| 2,753,689 | 7/1956 | Biggert, Jr. ............................ | 91/171 |
| 2,924,201 | 2/1960 | Giloridi ................................. | 91/177 |
| 3,039,513 | 6/1962 | Lasiewicz ............................. | 91/171 |
| 4,095,425 | 6/1978 | Brown .................................. | 60/484 |
| 4,169,404 | 10/1979 | Tsuchihashi ......................... | 901/22 |
| 4,216,701 | 8/1980 | Komoriya ............................. | 901/22 |
| 4,267,892 | 5/1981 | Mayer .................................. | 91/171 |
| 4,410,049 | 10/1983 | Molin .................................. | 901/22 |
| 4,567,813 | 2/1986 | Garnjost ............................... | 91/433 |

*Primary Examiner*—Abraham Hershkovitz
*Attorney, Agent, or Firm*—Wenderoth, Lind & Ponack

[57] ABSTRACT

A fluid servomechanism has a first actuator driven by fluid, a second actuator, and a pressure generator for generating pressure corresponding to the difference in displacement between output shafts of the first and the second actuators. Therefore, a compact-size finger facilitating angularly free movement and having a highly elaborate human-like function can be attained.

2 Claims, 7 Drawing Sheets

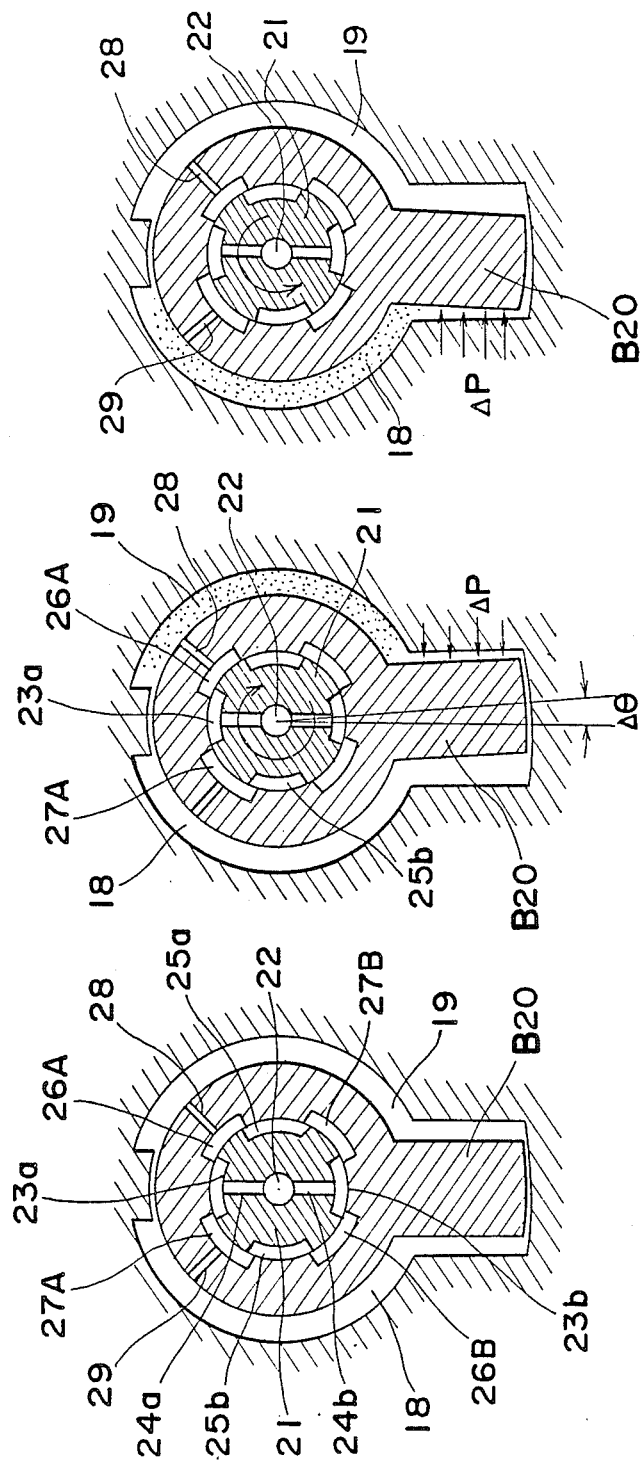

FLUID SERVOMECHANISM

BACKGROUND OF THE INVENTION

The present invention relates to a servomechanism driven by fluid pressure for use with various kinds of industrial machinery or industrial robots, etc.

The recent spread of industrial robots has developed a range of employment of robots, bringing about wider application thereof even in the field of assembling works which require highly elaborate techniques exercised only by skilled experts heretofore.

For the above purpose, however, it is essentially necessary to employ a manipulator that has flexible positioning and holding capability with respect to works having various configurations and that is freely maneuverable.

In the case of an electric actuator (DC servo, AC servo), since the ratio of power per weight of a motor thereof including a speed reducer is small, it is quite difficult, for example, to construct a wrist-finger having a small-size and that facilitates free movement at the end portion of a multi-joint arm of the robot.

On the other hand, a rotary actuator which uses a mechanical servo has been conventionally employed in order to control the displacement of an output shaft, the speed and the torque of an oil pressure actuator in accordance with input signals.

FIG. 5 shows the prior art rotary actuator. The actuator includes an input shaft 301, an output shaft 302, a guide valve sleeve 303, a fixed bridge 305, a rotor vane 306, a housing 307 and an oil port 308 through which working oil is supplied or discharged. The input shaft 301 is slidably accommodated within the output shaft 302. A guide valve 304 is formed between a groove formed in the outer surface of the input shaft 301 and a groove provided in the inner surface of the guide valve sleeve 303 fixed to the output shaft 302. When angular deviation is brought about between the input shaft 301 and the output shaft 302, the guide valve 304 is opened in proportion to the degree of the deviation. At this time, the motor produces torque in such direction as to compensate the deviation. As a result, the output shaft 302 is rotated, following the rotation of the input shaft 301. If the rotary actuator of the construction as described above is designed to be small in size for application, e.g., in the wrist-finger facilitating angular free movement, disadvantages as outlined below will result.

Specifically, when the rotary actuator shown in FIG. 5 is to be mounted in a joint of the finger, it is necessary that an electric motor for driving the input shaft 301 be provided adjacent to the actuator. Furthermore, if a DC motor is selected for the electric motor, encoder is required to detect angles of the input shaft 301 or the output shaft 302.

Therefore, even when the rotary actuator is desired to be small in size, such is difficult to attain because there exist limitations in the miniaturization of the DC motor and the encoder. Although the encoder can be dispensed with if a pulse motor is employed for the electric motor, in this case, it is disadvantageous in that the decomposing efficiency of the output shaft 302 is restricted by the number of poles of the pulse motor.

In the meantime, an actuator driven by oil pressure using an oil pressure servovalve has also been widely employed. However, even in the actuator of this type, the encoder is inevitably required to detect the position of the output shaft.

Accordingly, when any of the actuators driven by the electric motor and the actuator driven by oil pressure is employed, a small-sized finger of angularly free facilitation which manages approximately the same function as that of a human finger is considerably difficult to attain.

SUMMARY OF THE INVENTION

An essential object of the present invention is to provide a fluid servomechanism which comprises a first actuator driven by fluid, a second actuator and a pressure generating means for generating pressure corresponding to the difference of displacement between output shafts of the first and second actuators, the pressure generating means being arranged so as to drive at least one of the first and second actuators in accordance with the pressure produced thereby to produce motive power in such a direction as to reduce the difference of displacement between output shafts of the first and second actuators.

Another object of the present invention is to provide a fluid servomechanism of the type referred to above which comprises a first actuator driven by fluid, a second actuator, a pressure generating means for generating pressure corresponding to the difference of displacement between output shafts of the first and second actuators, the pressure generating means being arranged so as to drive at least one of the first and second actuators in accordance with the pressure produced thereby to produce motive power in such a direction as to reduce the difference of displacement between output shafts of the first and second actuators, and further including a displacement control means which detects the pressure produced by the pressure generating means and controls the displacement of the output shaft of the first actuator when the detected pressure reaches a predetermined value.

By employing the present invention, a robot finger that has a small size and a simple construction can be achieved, the holding force of which can be controlled from outside.

BRIEF DESCRIPTION OF THE DRAWINGS

These and other objects and features of the present invention will become apparent from the following description taken in conjunction with preferred embodiments thereof with reference to the accompanying drawings in which like parts are designated by like reference numerals and wherein;

FIGS. 2(a), 2(b) and 2(c) are respective cross-sectional views of a fluid compliance of the servomechanism of FIG. 1, illustrating the operating principle thereof;

DESCRIPTION OF THE PREFERRED EMBODIMENTS

Figure 1:
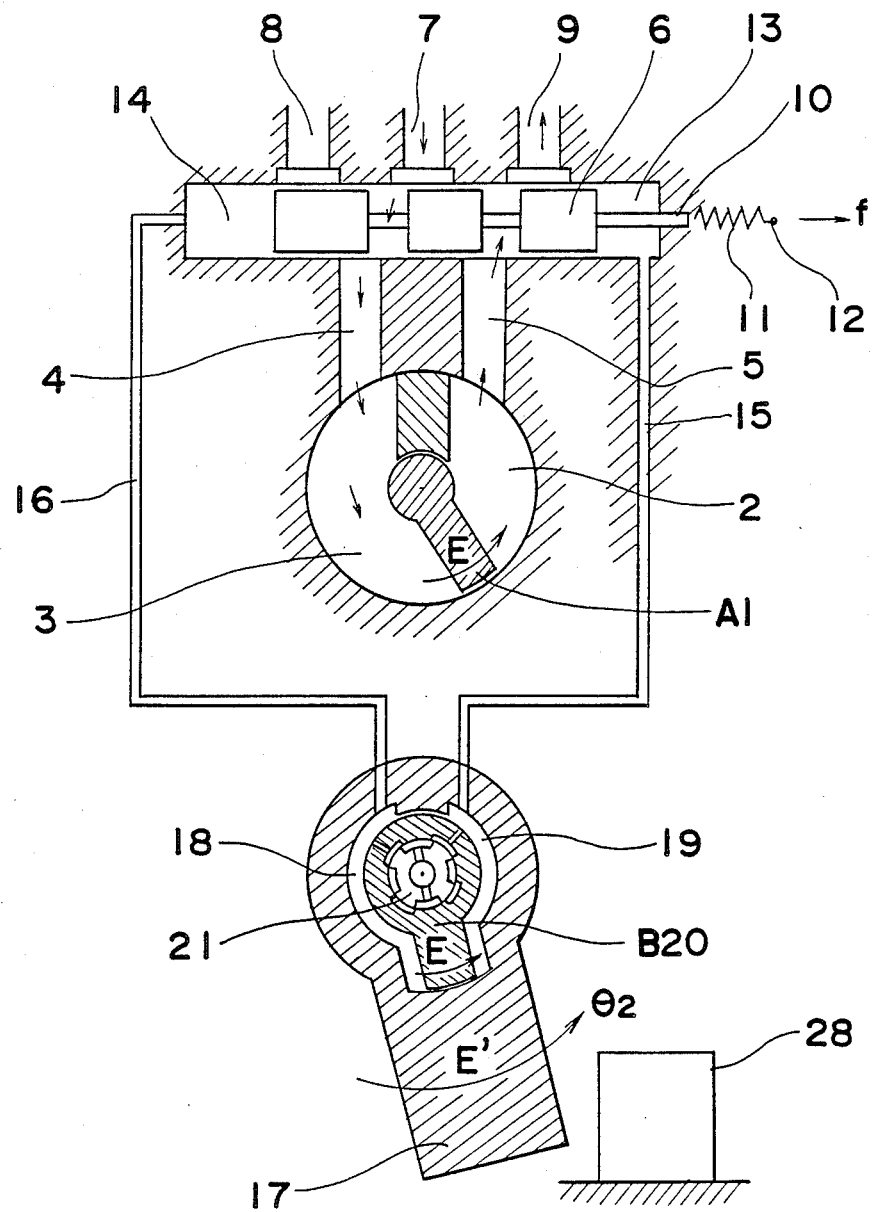
FIGS. 1(a) and 1(b) are respective cross-sectional views of a fluid servomechanism illustrating the principle embodied thereby according to the present invention.

In accomplishing the above-described objects, according to the present invention, there is provided a fluid servomechanism, the principle of which will now be described with reference to FIGS. 1 and 2.

The servomechanism of the present invention includes a vane A1 of an oil pressure actuator in the driving part, which corresponds to an output shaft of a first actuator, vane chambers 2 and 3, supply passages 4 and 5 for the actuator, a spool 6 of a servovalve consisting of a displacement control means embodying the present invention, a supply path 7, oil discharge paths 8 and 9, an input shaft 10 for the spool 6, a spring 11, an end portion 12 of the input shaft 10, end portions 13 and 14 of the spool 6, passages 15 and 16 for feedback of the pressure, a finger 17 which is an output shaft of a second actuator, oil chambers 18 and 19, a vane B20 integrally formed with the vane A1 and moving in association with the vane A1, and a central axis 21 fixed to the finger 17.

Referring particularly to FIGS. 2(a)-2(c), the portions adjacent the vane B20 and the central axis 21 will be described hereinafter. Adjacent the vane B20 and the central axis 21, there are a passage 22 at the side of high pressure, grooves 23a and 23b formed in the outer peripheral portion of the central axis 21 and paths 24a and 24b connecting the passage 22 with the grooves 23a and 23b. Grooves 25a and 25b are connected to a low-pressure source formed in the outer peripheral portion of the central axis 21. Moreover, there are grooves 26A, 26B, 27A and 27B formed in the inner peripheral portion of the vane B20. The grooves 26A and 27A are respectively coupled to the grooves 26B and 27B within the vane B20 (the concrete illustration will be abbreviated here for brevity). The groove 26A is connected to the oil chamber 19 through a path 28, while the groove 27A is connected to the oil chamber 18 through a path 29. All these grooves 23a, 23b, 25a, 25b, 26A, 26B, 27A and 27B constitute a bridge circuit which generates pressure that varies in proportion to the angular deviation of the central axis 21 with respect to the vane B20, and having fluid resistance. In the state shown in FIG. 2(a), the high pressure source of the fluid is, through the passages 22→24a→23a→27A→29→18 and the passages 22→24a 23a→26A→28→19, connected to the oil chambers 18 and 19 respectively via respective fluid resistances of equal strength. The passages through which the low pressure sources 25a and 25b are connected to the oil vanes 18 and 19 are in the same condition as described above, and therefore, no difference in pressure is observed between the two oil chambers 18 and 19. In the state shown in FIG. 2(b), the central axis 21 has an angular deviation of $\Delta\theta$ with respect to the vane B20. In this case, the passages connecting the oil chamber 18 with the groove 23a linked to the high pressure source are shut off, and accordingly the high pressure source is connected only to the oil chamber 19 through the passages 23a and 26A. Simultaneously, the oil chamber 18 is linked to the groove 25b connected to the low pressure source. Four fluid resistances are established due to the manner in which the grooves 23a, 23b, 25a and 25b formed in the outer peripheral portion of the central axis 21 overlap with the grooves 26A, 26B, 27A and 27B formed in the inner peripheral portion of the vane B20. Accordingly, the difference in pressure $\Delta P$ which corresponds to a restoring force M is proportional to the angular deviation $\Delta\theta$. FIG. 2(c) shows the case where $\Delta\theta < 0$ is established, and the restoring force is generated to the vane B20 in the direction reverse to that shown in FIG. 2(b).

Now, the working principle of the present invention will be explained in operational sequence again with reference to FIGS. 1(a) and 1(b).

As shown in FIG. 1(a), when a fixed force f=fo is given to the end portion 12 of the input shaft, the spool 6 of the valve is moved in the rightward direction. Subsequently, the ports of the valve are opened, and the vane A1 is rotated in the direction shown by arrow E by the high pressure fluid. At the same time, the vane B20 is rotated since the vane B20 is integrally formed with the vane A1. If only the vane B20 is rotated to bring about the angular deviation $\Delta\theta$ from the finger 17, a restoring force is generated that renders the angular deviation $\Delta\theta$ to be zero. Thus, the finger 17 is rotated in the same direction as the vane B20 shown by an arrow E', while maintaining the condition of $\Delta\theta \approx 0$. Contact of the rotating finger 17 with the work 28, as shown in FIG. 1(b), restricts the rotary movement of the finger. However, since the vane B20 keeps rotating in the same direction as before, the pressure P1 in the oil chamber 19 is raised while the pressure P2 in the oil chamber 18 is lowered. As a result, a large restoring force M equilibrating with a reaction force F from the work 28 is generated. In the meantime, the pressures P1 and P2 of the oil chambers 19 and 18 are subjected to feedback from the opposite end portions 14 and 13 of the spool 6 through the feedback passages 16 and 15, respectively. Supposing that the projected area of the end portion of the spool 6 is S, the feedback pressure brings about a force $f = S \cdot \Delta P$ which moves the spool 6 in the leftward direction (referring to FIG. 1(b)). In accordance with the increase of the angular deviation $\Delta\theta$, the pressure difference $\Delta P$ which is (P1−P2) is increased. When the force f' becomes equal to the originally set force fo, the movement of the spool 6 is stopped, thereby shutting off each port of the valve. Accordingly, the fluid is stopped from being supplied from the supply passages 4 and 5. The fluid within the vane chambers 2 and 3 is completely sealed, resulting in that the vanes A1 and B20 are locked. Thus, the finger 17 is stopped in contact with the work 28, as it maintains the moment M=Mo.

According to the present invention, since the final moment Mo exerted on the finger 17 corresponds to the input force f=fo added to the spool 6, Mo can be set at any desired value by the adjustment of the set force fo.

Even in the case where an internal leak is found in the actuator, the final moment Mo can be always maintained at the set value. This is because a slight rotation of the vane A1 due to the decrease of the pressure within the vane chambers 2 and 3 brings about the change in the angular deviation $\Delta\theta$ and the pressure difference $\Delta P$ to move the spool 6 and, open or close the ports of the valve again until the pressure difference $\Delta P$ becomes equal to the input force f. When the work 28 is slid in the rightward direction in FIG. 1(b), the finger 17 continues to be rotated until the moment Mo corresponds to the reaction force F from the work 28 is obtained.

In other words, the fluid compliance proposed by the present invention is such that a detecting function for detecting the reaction force from the work and a generating a function for generating force for holding the work are provided.

Figure 1B:
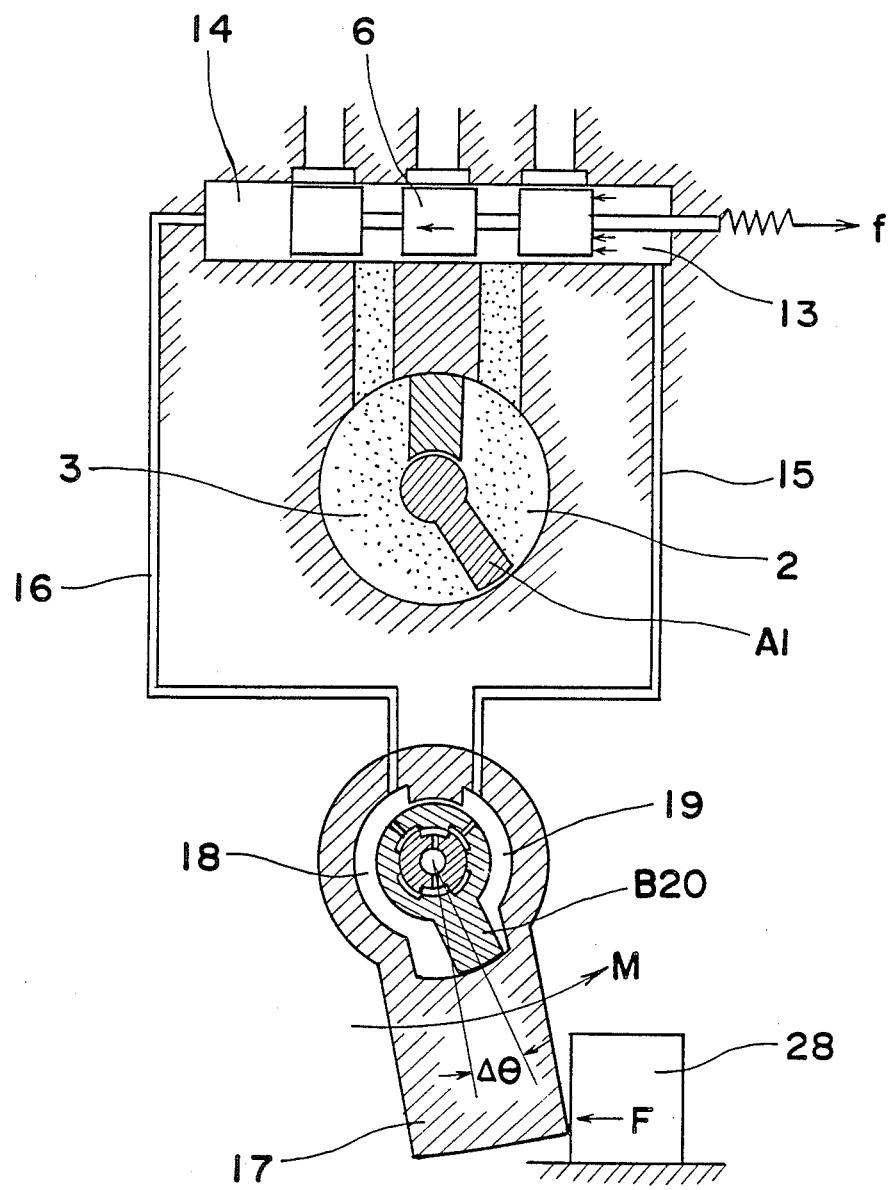
Figure 3A:
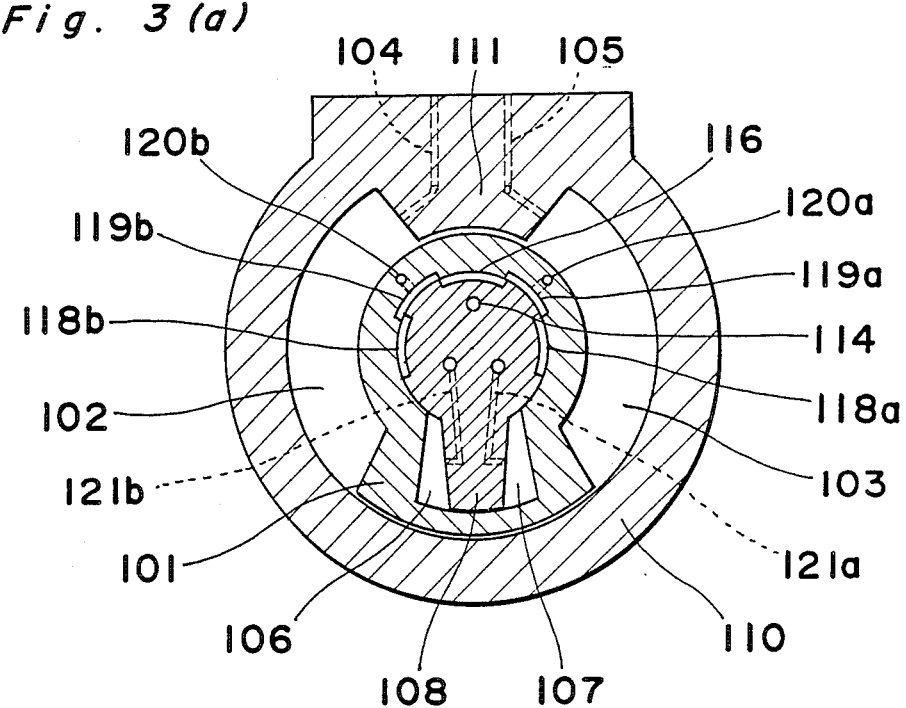
FIG. 3(a) is a longitudinal cross-sectional view of an actuator provided with a fluid compliance system according to one preferred embodiment of the present invention.
Figure 3B:
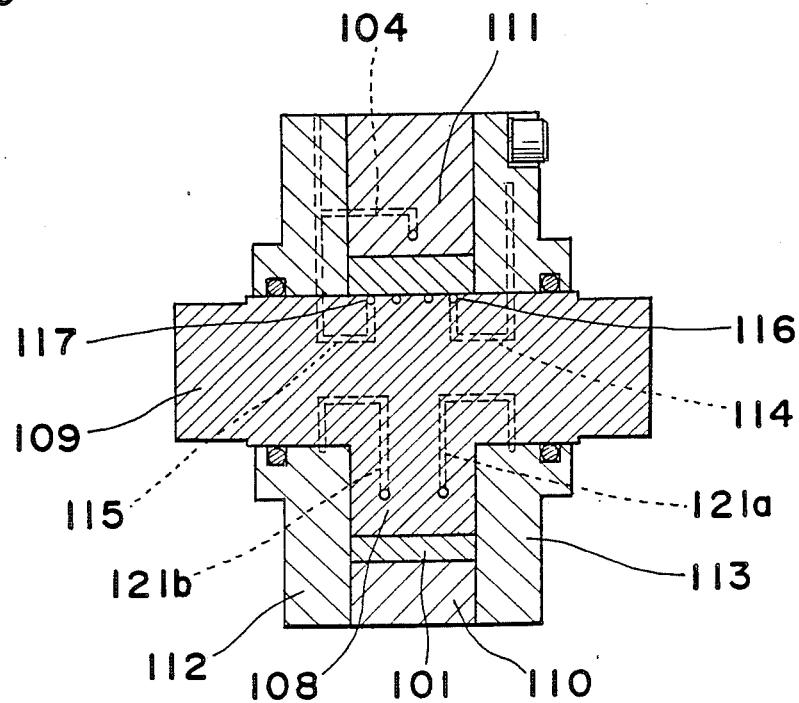
FIG. 3(b) is a lateral cross-sectional view of the actuator of FIG. 3(a)

Although the driving actuator is illustrated in separated form from the fluid compliance system in FIG. 1, both are integrally constituted in the embodiment of FIG. 3. In FIG. 3, the actuator is comprised of a vane A101 of an oil pressure actuator in the driving part which is an output shaft of a first actuator, vane chambers 102 and 103, supply passages 104 and 105 for the actuator, oil chambers 106 and 107, a vane B108 which is an output shaft of a second actuator, an output shaft 109 of a fluid compliance integral with the vane B108, a cylinder 110, a fixed vane 111, side plates 112 and 113, a passage 114 at the high pressure side, a passage 115 at the oil discharge side, a groove 116 leading to the passage 114, grooves 118a and 118b connected to the passage 115, grooves 119a and 119b formed in the inner surface of the vane A101, a path 120a formed inside the vane A101 for connecting the groove 119a with the oil chamber 106, a path 120b connecting the groove 119b with the oil chamber 107, detecting means 121a and 121b for detecting the pressure in the oil chambers 106 and 107 respectively. Further, there is formed a fluid bridge circuit, which is a pressure generating means, by the grooves 116, 118a and 118b provided in the vane B108 leading to the end portion of the spool (not shown) together with the grooves 119a and 119b provided in the vane A101. Moreover, the passages 104 and 105 are connected to the valve (not shown) described with reference to FIG. 1. The operational principle of the actuator of this embodiment is the same as that of the embodiment in FIGS. 1 and 2. The sequence of the operations of the actuator will be described hereinbelow.

(1) The vane A101 is rotated by the high pressure oil the flow rate of which is controlled by the valve.

(2) Upon generation of the angular deviation of the vane A101 from the vane B108, a pressure difference. which corresponds to the restoring force for making the above angular deviation zero arises between the oil chambers 106 and 107. Accordingly, the vane B108 is rotated, Accompanied with the rotation of the vane A101.

(3) The output shaft 109 integrally formed with the vane B108 is brought into contact with the work (not shown) placed outside the actuator. However, since the vane A101 is still being rotated, the pressure difference between in the oil chambers 106 and 107 is increased.

(4) Since the above-described oil chambers 106 and 107 are connected to the end portions of the spool of the valve shown in FIG. 1 (represented by reference numerals 13 and 14 in FIG. 1), the ports of the valve are shut off by the increase of the pressure difference between the oil chambers 106 and 107, and thus the vane A101 is locked.

In the embodiment of FIG. 3, the fluid compliance system is accommodated within the actuator, thereby realizing a remarkably simple construction of the actuator. Moreover, since the vane B108 is included inside the vane A101, the pressure receiving area of the vanes A101 and B108 can be made sufficiently large, and therfore, there is no possibility in a decrease in the driving force of the output shaft 109.

According to the embodiments shown in FIGS. 1–3, the flow rate of the oil into or out of the vane chambers (3 and 2 in FIG. 1) is controlled by the exteriorly-provided servovalve through detection of the pressure in the oil chambers (for example, 18 and 19 of FIG. 1) via feedback passages (15 and 16 of FIG. 1). However, if the feedback passages are abbreviated, the actuator is applicable as an oil pressure actuator equipped with a fluid cushion. Furthermore, air can be employed in place of oil.

Figure 4A:
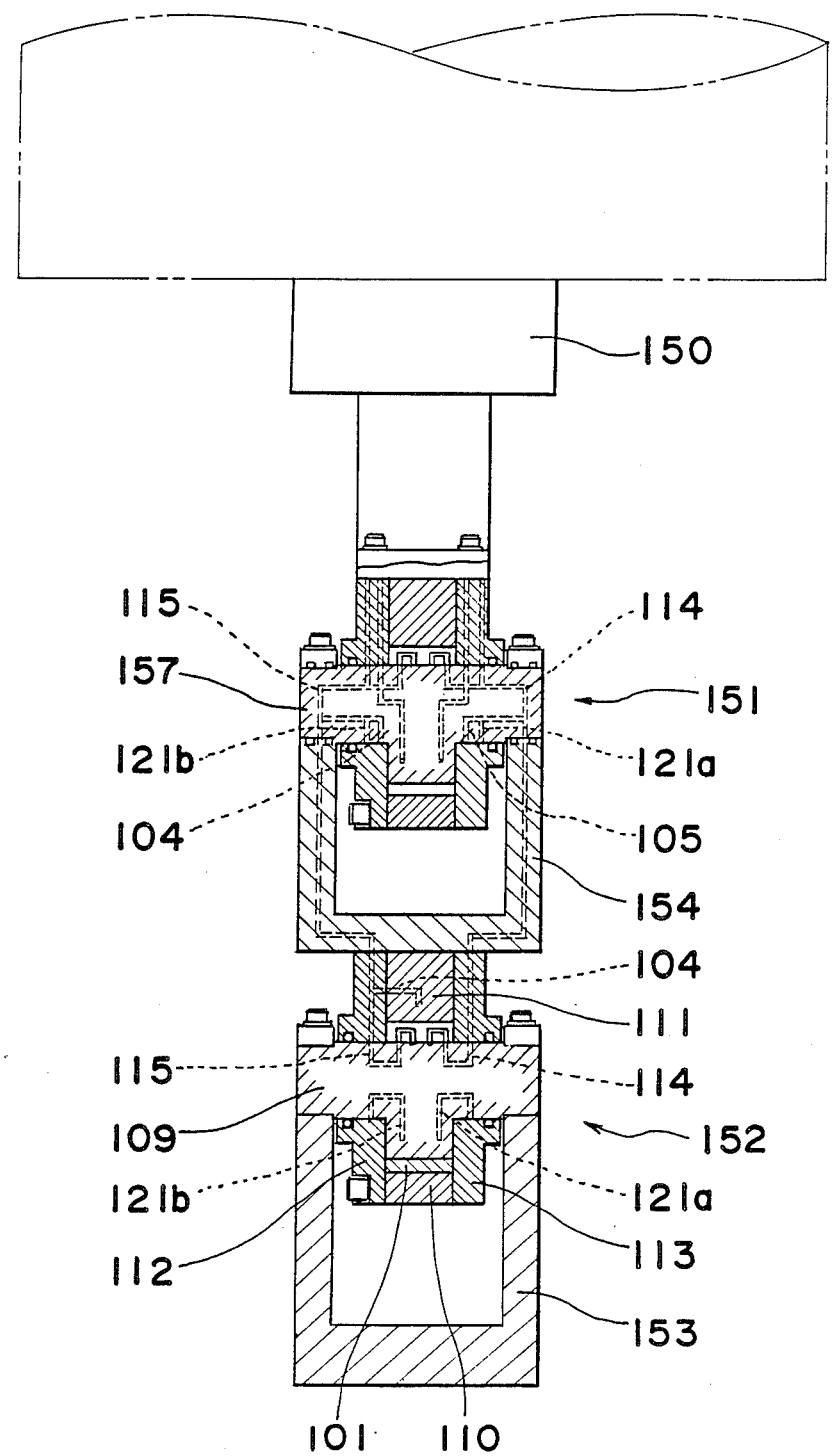
FIG. 4(a) is a side elevational view of a robot finger according to another embodiment of the present invention.
Figure 4B:
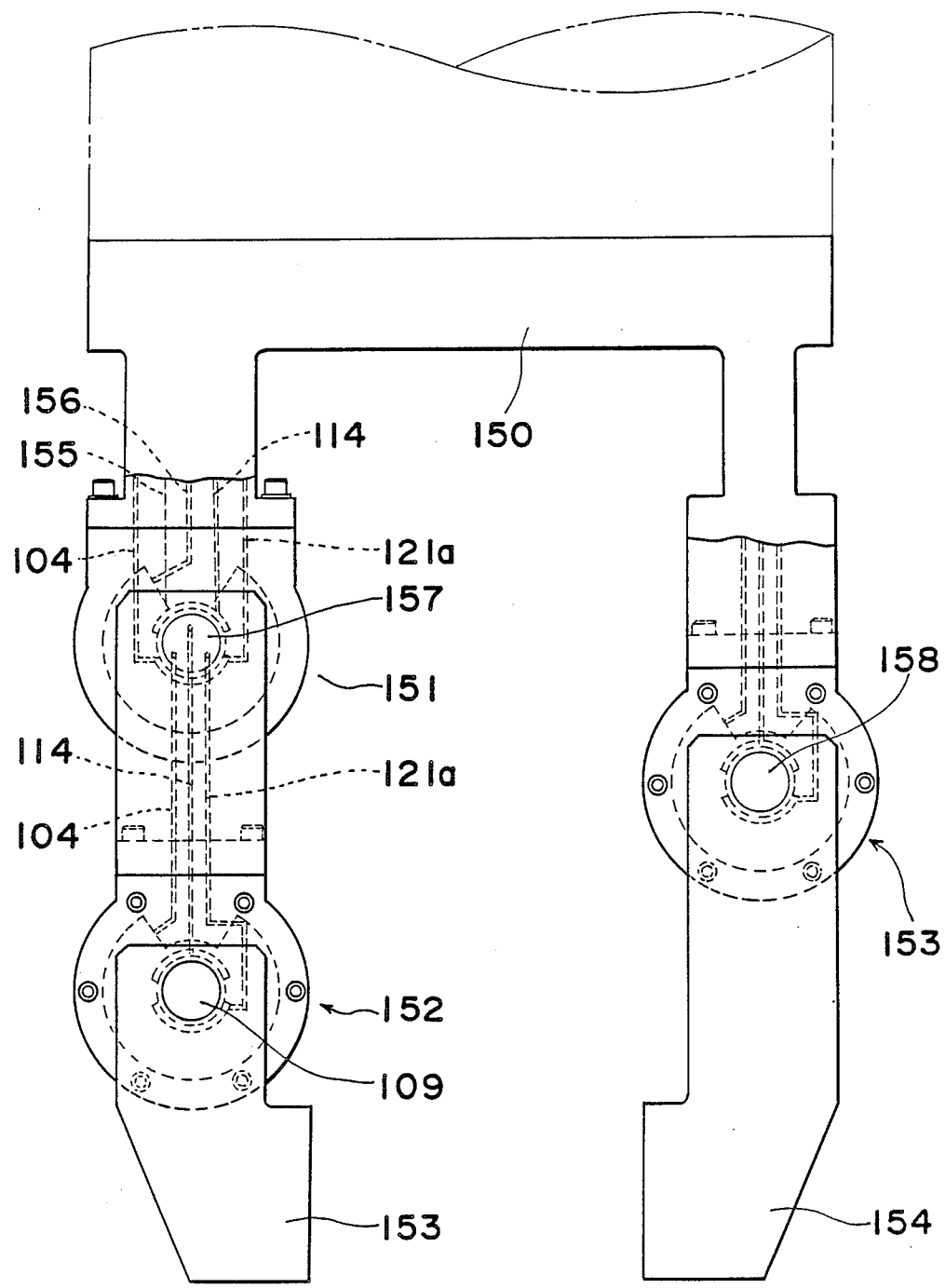
FIG. 4(b) is a front elevational view of the robot finger of FIG. 4(a)
Figure 5B:
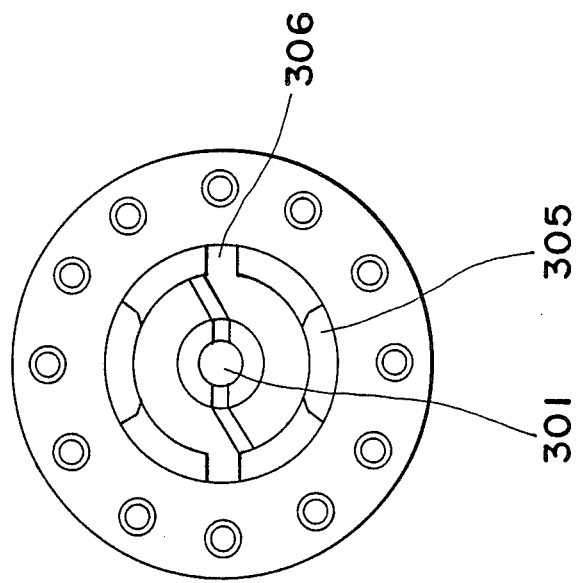
FIG. 5(b) is a plan view of the actuator of FIG. 5(a).
Figure 5A:
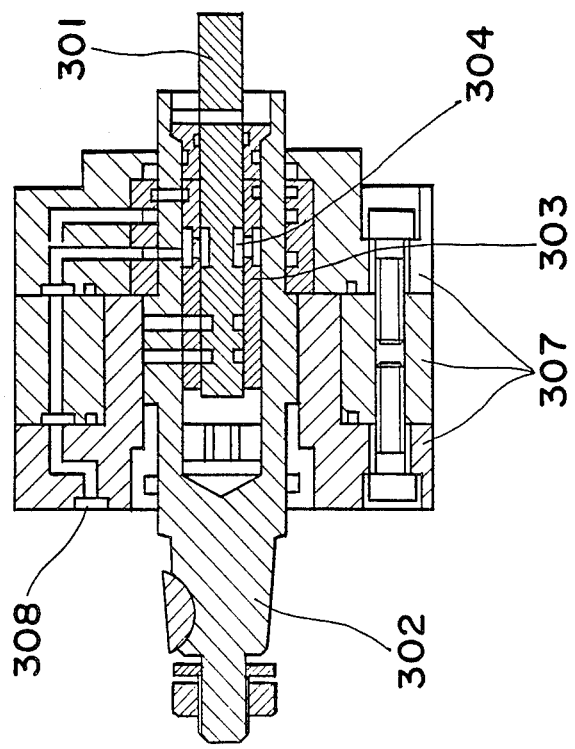
FIG. 5(a) is a longitudinal cross-sectional view of a prior art oil pressure actuator.

Referring to FIG. 4, there is shown a robot finger which uses the actuator equipped with the fluid compliance system shown in FIG. 3. The finger is comprised of a fixed part 150 and three actuators 151, 152 and 153. These acruators are installed in respective joint portions of the finger and provided individually with the compliance function. The actuators 151 and 152 are coupled to each other through a coupling member 154. Finger parts 153 and 154 are connected respectively to output shafts of the actuators 152 and 153. According to this embodiment, an oil path is provided through pipes in the interior of the actuators 151, 152 and 153, and the coupling member 154. By way of example, the actuator 152 has every three passages formed in each of the side plates 112 and 113, that is, passages 121a and 121b for detecting the pressure in the oil chamber, passage 114 at the high pressure side connected to the fluid bridge, passage 115 at the oil discharge side and supply passages 104 and 105.

Among the above-described six passages, the passages 114 and 115 are employable in common for the actuator 151. Therefore, the actuator 151 has every five passages formed in each of the side plates since passages 156 and 155 are added.

Each of the actuators 151, 152 and 153 of the finger shown in FIG. 4 is separately rotated until the moment of the reaction force from the respective works to be added to output shafts 109, 157 and 158 reaches a predetermined force.

As has been described hereinabove, the fluid servomechanism of the present invention is comprised of a first actuator driven by fluid, a second actuator, and pressure generating means for generating pressure corresponding to the difference in displacement between output shafts of the first and the second actuators. The pressure generating means is arranged so as to drive at least one of the first and the second actuators to produce power in such a direction as to reduce the difference in displacement between output shafts of the actuators. By the application of the servomechanism of the present invention, therefore, a compact-size finger facilitating angularly free movement and having a highly elaborate human-like function which has never been achieved by the prior art robot fingers can be realized. For example, the finger in accordance with the present invention is able (1) to hold, (2) to clasp and (3) to pick up. The features of the finger will be summarized as follows:

(1) Any one of work pieces having various shapes and various weights can be held.

(2) The holding force of the finger can be determined from outside.

(3) A wide range of control of force can be effected, and moreover, a large force can be produced by the use of characteristics of oil pressure.

(4) Any work can be held softly and gently. When t in contact with the work is 0, an equation f=0 is established, due to the fluid compliance system.

(5) A slim and slender construction of the finger can be obtained since there is no motor and no encoder provided in the finger parts.

(6) A high reliability is guaranteed, without the need for a distortion gauge or a tactile sensor.

Thus, the present invention can not only be used for industrial robots, but also is applicable to industrial machinery or tools in various fields including factory automatization.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A fluid servomechanism comprising:
a first fluid driven actuator having an output shaft;
a second driven actuator having an output shaft, the output shaft of said first actuator being displaceable relative to the output shaft of said second actuator when driven;
pressure generating means for generating pressure that corresponds to the displacement of the output shaft of said first actuator relative to the output shaft of said second actuator to drive the second actuator in a direction which reduces the displacement of the output shaft of said first fluid driven actuator relative to the output shaft of said second actuator;
first and second fluid chambers on opposite sides of the output shaft of said first actuator;
a fluid supply source operatively hydraulically connected to said chambers for supplying fluid;
third and fourth fluid chambers each of which is disposed between the output shaft of said second actuator and a respective face of the output shaft of said first actuator and in which pressure is generated by said pressure generating means to drive said second actuator; and
control means for detecting the pressure generated by said pressure generating means and for controlling the displacement of the output shaft of said first actuator when the pressure detected reaches a predetermined value,
said control means comprising a spool disposed between said fluid supply source and said first and second fluid chambers for selectively allowing fluid to be supplied to said first and second chambers, said feedback lines each of which is in hydraulic communication with a respective end of said spool and one of said third and fourth chambers and through which pressure generated by said pressure generating means in said third and fourth chambers passes so as to control said spool.

2. A fluid servomechanism as claimed in claim 1, wherein said second actuator is a fluid driven actuator,
and said pressure generating means comprises a fluid bridge defined between the output shaft of said first actuator and the output shaft of said second actuator, the fluid bridge connected to a high pressure fluid source for allowing said high pressure source to generate effective pressure acting on said second actuator to drive said second actuator when the output shaft of said first actuator is displaced relative to the output shaft of said second actuator.

* * * * *